US009712502B2

(12) United States Patent
Vaarala et al.

(10) Patent No.: US 9,712,502 B2
(45) Date of Patent: *Jul. 18, 2017

(54) METHOD AND SYSTEM FOR SENDING A MESSAGE THROUGH A SECURE CONNECTION

(71) Applicant: MPH Technologies Oy, Espoo (FI)

(72) Inventors: Sami Vaarala, Helsinki (FI); Antti Nuopponen, Espoo (FI)

(73) Assignee: MPH Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,558

(22) Filed: Dec. 12, 2016

(65) Prior Publication Data

US 2017/0099266 A1    Apr. 6, 2017

Related U.S. Application Data

(63) Continuation of application No. 15/372,208, filed on Dec. 7, 2016, which is a continuation of application No. 13/685,544, filed on Nov. 26, 2012, which is a continuation of application No. 10/500,930, filed as application No. PCT/FI03/00045 on Jan. 21, 2003, now Pat. No. 8,346,949.

(30) Foreign Application Priority Data

Jan. 22, 2002 (FI) ...................................... 20020112

(51) Int. Cl.
*H04L 9/32* (2006.01)
*G06F 15/16* (2006.01)
*H04L 29/06* (2006.01)

(52) U.S. Cl.
CPC ...... *H04L 63/0428* (2013.01); *H04L 63/0281* (2013.01); *H04L 63/061* (2013.01)

(58) Field of Classification Search
USPC .......................................... 709/236, 239, 245
See application file for complete search history.

(56) References Cited

U.S. PATENT DOCUMENTS 6,718,388 B1 *  4/2004  Yarborough ........ H04L 63/0227
                                                   709/217
6,732,269 B1 *  5/2004  Baskey ................. H04L 63/166
                                                   713/153

(Continued)

*Primary Examiner* — Afshawn Towfighi
(74) *Attorney, Agent, or Firm* — Fasth Law Offices; Rolf Fasth

(57) ABSTRACT

The method and system enable secure forwarding of a message from a first computer to a second computer via an intermediate computer in a telecommunication network. A message is formed in the first computer or in a computer that is served by the first computer, and in the latter case, sending the message to the first computer. In the first computer, a secure message is then formed by giving the message a unique identity and a destination address. The message is sent from the first computer to the intermediate computer after which the destination address and the unique identity are used to find an address to the second computer. The current destination address is substituted with the found address to the second computer, and the unique identity is substituted with another unique identity. Then the message is forwarded to the second computer.

10 Claims, 6 Drawing Sheets

(56) References Cited

U.S. PATENT DOCUMENTS

| | | | | |
|---|---|---|---|---|
| 6,795,917 B1* | 9/2004 | Ylonen | ............... | H04L 29/06 |
| | | | | 713/160 |
| 6,957,346 B1* | 10/2005 | Kivinen | ............. | H04L 12/4633 |
| | | | | 713/153 |
| 6,985,953 B1* | 1/2006 | Sandhu | ............... | G06F 17/3089 |
| | | | | 709/225 |
| 7,055,027 B1* | 5/2006 | Gunter | ............... | H04L 63/30 |
| | | | | 709/223 |
| 2001/0047487 A1* | 11/2001 | Linnakangas | ....... | H04L 63/0428 |
| | | | | 726/12 |
| 2002/0004900 A1* | 1/2002 | Patel | ............... | G06Q 30/02 |
| | | | | 713/155 |
| 2002/0091921 A1* | 7/2002 | Kunzinger | ......... | H04L 63/0428 |
| | | | | 713/153 |

* cited by examiner

| c-addr-1 | c-addr-2 | c-SPI-1 | c-SPI-2 | s-addr-2 | s-addr-3 | s-SPI-2 | s-SPI-3 |
|---|---|---|---|---|---|---|---|
| 195.1.2.3 | 212.90.65.1 | 0x80000001 | 0x12341234 | 212.90.65.1 | 103.6.5.4 | 0x1230012 | 0x567785678 |
| ... | ... | ... | ... | ... | ... | ... | ... |

FIG. 3

| Mapping field | Stage 1 | Stage 2 | Stage 3 | Stage 4 |
|---|---|---|---|---|
| c-addr-1 | 195.1.2.3 | 195.1.2.3 | 195.1.2.3 | 195.1.2.3 |
| c-addr-2 | 212.90.65.1 | 212.90.65.1 | 212.90.65.1 | 212.90.65.1 |
| c-icky | CKY1 | CKY1 | CKY1 | CKY1 |
| c-rcky | 0 | 0 | 0 | CKY4 |
| c-userid | joe@netseal.com | joe@netseal.com | joe@netseal.com | joe@netseal.com |
| s-addr-2 | n/a | 212.90.65.1 | 212.90.65.1 | 212.90.65.1 |
| s-addr-3 | n/a | 103.6.5.4 | 103.6.5.4 | 103.6.5.4 |
| s-icky | n/a | CKY2 | CKY2 | CKY2 |
| s-rcky | n/a | 0 | CKY3 | CKY3 |

FIG. 5

| Identification type | Identification value | SGW address |
|---|---|---|
| User@Fully-Qualified-Domain-Name | *.smith@netseal.com | 123.1.2.3 |
| user@Fully-Qualified-Domain-Name | *@netseal.com | 103.6.5.4 |
| Distinguished Name | "CN=Sami Vaarala, DC=netseal, DC=com" | 122.4.3.2 |
| Fully-Qualified-Domain-Name | host4.roammate.com | 123.3.2.1 |
| Employee number and company | "190170 / NetSeal Technologies" | 123.4.3.2 |
| ... | ... | ... |

FIG. 6

METHOD AND SYSTEM FOR SENDING A MESSAGE THROUGH A SECURE CONNECTION

PRIOR APPLICATIONS

This application is a U.S. Continuation patent application that claims priority from U.S. Continuation patent application Ser. No. 15/372,208, filed 7 Dec. 2016 that claims priority from U.S. Continuation patent application Ser. No. 13/685,544, filed 26 Nov. 2012 that claims priority from U.S. patent application Ser. No. 10/500,930, filed 19 Oct. 2005, which claims priority from PCT/FI03/00045, filed 21 Jan. 2003, that claims priority from Finnish Pat. App. No. 20020112, filed 22 Jan. 2002.

TECHNICAL FIELD

The method and system of the invention are intended to secure connections in telecommunication networks. Especially, it is meant for wireless Internet Service Provider (ISP) connections.

TECHNICAL BACKGROUND

An internetwork is a collection of individual networks connected with intermediate networking devices that function as a single large network. Different networks can be interconnected by routers and other networking devices to create an internetwork.

A local area network (LAN) is a data network that covers a relatively small geographic area. It typically connects workstations, personal computers, printers and other devices. A wide area network (WAN) is a data communication network that covers a relatively broad geographic area. Wide area networks (WANS) interconnect LANs across normal telephone lines and, for instance, optical networks; thereby interconnecting geographically disposed users.

There is a need to protect data and resources from disclosure, to guarantee the authenticity of data, and to protect systems from network based attacks. More in detail, there is a need for confidentiality (protecting the contents of data from being read) integrity (protecting the data from being modified, which is a property that is independent of confidentiality), authentication (obtaining assurance about she actual sender of data), replay protection (guaranteeing that data is fresh, and not a copy of previously sent data), identity protection (keeping the identities of parties exchanging data secret from outsiders), high availability, i.e. denial-of-service protection (ensuring that the system functions even when under attack) and access control. IPSec is a technology providing most of these, but not all of them. (In particulars identity protection is not completely handled by IPSec, and neither is denial-of-service protection.)

The IP security protocols (IPSec) provides the capability to secure communications between arbitrary hosts, e.g. across a LAN, across private and public wide area networks (WANs) and across the internet IPSec can be used in different ways, such as for building secure virtual private networks, to gain a secure access to a company network, or to secure communication with other organisations, ensuring authentication and confidentiality and providing a key exchange mechanism. IPSec ensures confidentiality integrity, authentication, replay protection, limited traffic flow confidentiality, limited identity protection, and access control based on authenticated identities. Even if some applications already have built in security protocols, the use of IPSec further enhances the security.

IPSec can encrypt and/or authenticate traffic at IP level. Traffic going in to a WAN is typically compressed and encrypted and traffic coming from a WAN is decrypted and decompressed. IPSec is defined by certain documents, which contain rules for the IPSec architecture. The documents that define IPSec, are, for the time being, the Request For Comments (RFC) series of the Internet Engineering Task Force (IETF), in particular, RFCs 2401-2412.

Two protocols are used to provide security at the IP layer; an authentication protocol designated by the header of the protocol, Authentication Header (AH), and a combined encryption/authentication protocol designated by the format of the packet for that protocol, Encapsulating Security Payload (ESP) AH and ESP are however similar protocols, both operating by adding a protocol header. Both AH and ESP are vehicles for access control based on the distribution of cryptographic keys and the management of traffic flows related to these security protocols.

Security association (SA) is a key concept in the authentication and the confidentiality mechanisms for IP. A security association is a one-way relationship between a sender and a receiver that offers security services to the traffic carried on it if a secure two-way relationship is needed, then two security associations are required. If ESP and AH are combined, or if ESP and/or AH are applied more than once, the term SA bundle is used, meaning that two or more SAs are used. Thus, SA bundle refers to one or more SAs applied in sequence, e.g. by first performing an ESP protection, and then an AH protection. The SA bundle is the combination of all SAs used to secure a packet.

The term IPsec connection is used in what follows in place of an IPSec bundle of one or more security associations, or a pair of IPSec bundles—one bundle for each direction—of one or more security associations. This term thus covers both unidirectional and bi-directional traffic protection. There is no implication of symmetry of the directions, i.e., the algorithms and IPSec transforms used for each direction may be different.

A security association is uniquely identified by three parameters. The first one, the Security Parameters Index (SPI), is a bit string assigned to this SA The SPI is carried in AH and ESP headers to enable the receiving system to select the SA under which a received packet will be processed. IP destination address is the second parameter, which is the address of the destination end point of the SA, which may be an end user system or a network system such as a firewall or a router. The third parameter, the security protocol identifier indicates whether the association is an AH or ESP security association.

In each IPSec implementation, there is a nominal security association data base (SADB) that defines the parameters associated with each SA. A security association is normally defined by the following parameters. The Sequence Number Counter is a 32-bit value used to generate the sequence number field in AH or ESP headers. The Sequence Counter Overflow is a flag indicating whether overflow of the sequence number counter should generate an auditable event and prevent further transmission of packets on this SA. An Anti-Replay Window is used to determine whether an inbound AH or ESP packet is a replay. AH information involves information about the authentication algorithm, keys and related parameters being used with AH. ESP information involves information of encryption and authentication algorithms, keys, initialisation vectors, and related parameters being used with IPSec. AH information consists of the authentication algorithm, keys and related parameters being used with AH. ESP information consists of encryption and authentication algorithms, keys, cryptographic initialisation vectors and related parameters being used with ESP. The sixth parameter, Lifetime of this Security Association, is a time-interval and/or byte-count after which this SA must be replaced with a new SA (and new SPI) or terminated plus an indication of which of these actions should occur. IPSec Protocol Mode is either tunnel or transport mode. Maximum Transfer Unit (MTU), an optional feature, defines the maximum size of a packet that can be transmitted without fragmentation. Optionally an MTU discovery protocol may be used to determine the actual MTU for a given route, however, such a protocol is optional.

Both AH and ESP support two modes used, transport and tunnel mode.

Transport mode provides protection primarily for upper layer protocols and extends to the payload of an IP packet Typically, transport mode is used for end-to-end communication between two hosts. Transport mode may be used in conjunction with a tunnelling protocol, other than IPSec tunnelling, to provide a tunnelling capability.

Tunnel mode provides protection to the entire IP packet and is usually used for sending messages through more than two components, although tunnel mode may also be used for end-to-end communication between two hosts. Tunnel mode is often used when one or both ends of a SA is a security gateway, such as a firewall or a router that implements IPSec. With tunnel mode, a number of hosts on networks behind firewalls may engage in secure communications without implementing IPSec. The unprotected packets generated by such hosts are tunnelled through external networks by tunnel mode SAs set up by the IPSec software in the firewall or secure router at boundary of the local network.

To achieve this, after the AH or ESP fields are added to the IP packet, the entire packet plus security fields are treated as the payload of a new outer IP packet with a new outer IP header. The entire original, or inner, packet travels through a tunnel from one point of an IP network to another: no routers along the way are able to examine the inner IP packet. Because the original packet is encapsulated, the new larger packet may have totally different source and destination addresses, adding to the security. In other words, the first step in protecting the packet using tunnel mode is to add a new IP header to the packet; thus the "IP|payload" packet becomes "IP|IP|payload". The next step is to secure the packet using ESP and/or AH. In case of ESP, the resulting packet is "IP|ESP|IP|payload". The whole inner packet is covered by the ESP and/or AH protection. AH also protects parts of the outer header, in addition to the whole inner packet. The IPSec tunnel mode operates e.g. in such a way that if a host on a network generates an IP packet with a destination address of another host on another network, the packet is routed from the originating host to a security gateway (SGW), firewall or other secure router at the boundary of the first network. The SGW or the like filters all outgoing packets to determine the need for IPSec processing. If this packet from the first host to another host requires IPSec, the firewall performs IPSec processing and encapsulates the packet in an outer IP header. The source IP address of this outer IP header is this firewall and the destination address may be a firewall that forms the boundary to the other local network. This packet is now routed to the other host's firewall with intermediate routers examining only the outer IP header At the other host firewall, the outer IP header is stripped off and the inner packet is delivered to the other host.

ESP in tunnel mode encrypts and optionally authenticates the entire inner IP packet, including the inner IP header AH in tunnel mode authenticates the entire inner IP packet, including the inner IP header, and selected portions of the outer IP header.

The key management portion of IPSec involves the determination and distribution of secret keys. The default automated key management protocol for IPSec is referred to as ISAKMP/Oakley and consists of the Oakley key determination protocol and Internet Security Association and Key Management Protocol (ISAKMP). Internet key exchange (IKE) is a newer name for the ISAKMP/Oakley protocol. IKE is based on the Diffie-Hellman algorithm and supports RSA signature authentication among other modes. IKE is an extensible protocol, and allows future and vendor-specific features to be added without compromising functionality.

IPSec has been designed to provide confidentiality, integrity, and replay protection for IP packets. However, IPSec is intended to work with static network topology, where hosts are fixed to certain subnetworks. For instance, when an IPSec tunnel has been formed by using Internet Key Exchange (IKE) protocol, the tunnel endpoints are fixed and remain constant. If IPSec is used with a mobile host, the IKE key exchange will have to be redone from every new visited network. This is problematic, because IKE key exchanges involve computationally expensive Diffie-Hellman key exchange algorithm calculations and possibly RSA calculations. Furthermore, the key exchange requires at least three round trips (six messages) if using the IKE aggressive mode followed by IKE quick mode, and nine messages if using IKE main mode followed by IKE quick mode. This may be a big problem in high latency networks, such as General Packet Radio Service (GPRS) regardless of the computational expenses.

In this text, the term mobility and mobile terminal does not only mean physical mobility, instead the term mobility is in the first hand meant moving from one network to another, which can be performed by a physically fixed terminal as well.

The problem with standard IPSec is thus that it has been designed for static connections. For instance, the end points of an IPSec tunnel mode SA are fixed. There is also no method for changing any of the parameters of an SA, other than by establishing a new SA that replaces the previous one. However, establishing SAs is costly in terms of both computation time and network latency.

An example of a specific scenario where these problems occur is described next in order to illustrate the problem.

In the scenario, there is a standard IPSec security gateway, which is used by a mobile terminal e.g. for remote access. The mobile terminal is mobile in the sense that it changes its network point of attachment frequently. A mobile terminal can in this text thus be physically fixed or mobile. Because it may be connected to networks administered by third parties, it may also have a point of attachment that uses private addresses—i.e., the network is behind a router that performs network address translation (NAT). In addition, the networks used by the mobile terminal for access may be wireless, and may have poor quality of service in terms of throughput and e.g. packet drop rate.

Standard IPSec does not work well in the scenario. Since IPSec connections are bound to fixed addresses, the mobile terminal must establish a new IPSec connection from each point of attachment. If an automated key exchange protocol, such as IKE, is used, setting up a new IPsec connection is costly in terms of computation and network latency, and may require a manual authentication phase (for instance, a one-time password). If IPSec connections are set up manually, there is considerable manual work involved in configuring the IPSec connection parameters.

Standard IPSec does e.g. not work through NAT devices at the moment. A standard IPSec NAT traversal protocol is currently being specified, but the security gateway in the scenario might not support an IPSec protocol extended in this way. Furthermore, the current IPSec NAT traversal protocols are not well suited to mobility.

There are no provisions for improving quality of service over wireless links in the standard IPSec protocol. If the access network suffers from high packet drop rates, the applications running in the mobile host and a host that the mobile terminal is communicating with will suffer from packet drops.

A known method of solving some of these problems is based on having an intermediate host between the mobile terminal and the IPSec security gateway. The intermediate host might be a Mobile IP home agent, that provides mobility for the connection between the mobile terminal and the home agent, while the connection from the mobile node to the security gateway is an ordinary IPSec connection. In this case, packets sent by an application in the mobile client are first processed by IPSec, and then by Mobile IP.

In the general case, this implies both Mobile IP and IPSec header fields for packets exchanged by the mobile terminal and the home agent. The Mobile IP headers are removed by the home agent prior to delivering packets to the security gateway, and added when delivering packets to the mobile terminal. Because of the use of two tunnelling protocols (Mobile IP and IPSec tunnelling), the solution is referred to as "double tunnelling" in this document.

The above method solves the mobility problem, at the cost of adding extra headers to packets. This may have a significant impact on networks that have low throughput such as the General Packet Radio System (GPRS).

Another known method is again to use an intermediate host between the mobile client and the IPSec security gateway. The intermediate host has an IPSec implementation that may support NAT traversal, and possibly some proprietary extensions for improving quality of service of the access network, for instance.

The mobile host would now establish an IPSec connection between itself and the intermediate host, and would also establish an IPSec connection between itself and the IPSec security gateway. This solution is similar to the first known method, except that two IPSec tunnels are used. It solves a different set of problems—for instance, NAT traversal—but also adds packet size overhead because of double IPsec tunnelling.

A third known method is to use a similar intermediate host as in the second known method, but establish an IPSec connection between the mobile terminal and the intermediate host, and another, separate IPSec connection between the intermediate host and the security gateway. The IPSec connection between the mobile terminal and the intermediate host may support NAT traversal, for instance, while the second IPSec connection does not need to.

When packets are sent by an application in the mobile terminal, the packets are IPSec-processed using the IPSec connection shared by the mobile terminal and the intermediate host. Upon receiving these packets, the intermediate host undoes the IPSec-processing. For instance, if the packet was encrypted, the intermediate host decrypts the packet. The original packet would now be revealed in plaintext to the intermediate host. After this, the intermediate host IPSec-processes the packet using the IPSec connection shared by the intermediate host and the security gateway, and forwards the packet to the security gateway.

This solution allows the use of an IPSec implementation that support NAT traversal, and possibly a number of other (possibly vendor specific) improvements, addressing problems such as the access network quality of service variations. Regardless of these added features, the IPSec security gateway remains unaware of the improvements, and is not required to implement any of the protocols involved in improving service. However, the solution has a major drawback: the IPsec packets are decrypted in the intermediate host, and thus possibly sensitive data is unprotected in the intermediate host.

Consider a business scenario where a single intermediate host provides improved service to a number of separate customer networks, each having its own standard IPSec security gateway. Having decrypted packets of various customer networks in plaintext form in the intermediate host is clearly a major security problem.

To summarise, the known solutions either employ extra tunnelling, causing extra packet size overhead, or use separate tunnels, causing potential security problems in the intermediate host(s) that terminate such tunnels.

THE OBJECT OF THE INVENTION

The object of the invention is to develop a method for forwarding secure messages between two computers, especially, via an intermediate computer by avoiding the above mentioned disadvantages.

Especially, the object of the invention is to forward secure messages in a way that enables changes to be made in the secure connection

SUMMARY OF THE INVENTION

The method and system of the invention enable secure forwarding of a message from a first computer to a second computer via an intermediate computer in a telecommunication network. It is mainly characterized in that a message is formed in the first computer or in a computer that is served by the first computer, and in the latter case, sending the message to the first computer. In the first computer, a secure message is then formed by giving the message a unique identity and a destination address. The message is sent from the first computer to the intermediate computer, whereafter said destination address and the unique identity are used to find an address to the second computer. The current destination address is substituted with the found address to the second computer, and the unique identity is substituted with another unique identity. Then the message is forwarded to the second computer.

Preferably, the first computer processes the formed message using a security protocol and encapsulates the message at least in an outer IP header. The outer IP header source address is the current address of the first computer, while the destination address is that of the intermediate computer. The message is then sent to the intermediate computer, which matches the outer IP header address fields together with a unique identifier used by the security protocol, and performs a translation of the outer addresses and the unique identity used by the security protocol. The translated packet is then sent to the second computer, which processes it using the standard security protocol in question. In the method of the invention, there is no extra encapsulation overhead as in the prior art methods. Also, the intermediate computer does not need to undo the security processing, e.g. decryption, and thus does not compromise security as in the prior art methods.

Corresponding steps are performed when the messages are sent in the reverse direction, i.e. from the second computer to the first computer.

Preferably, the secure message is formed by making use of the IPSec protocols, whereby the secure message is formed by using an IPsec connection between the first computer and the intermediate computer. The message sent from the first computer contains message data, an inner IP header containing actual sender and receiver addresses, an outer IP header containing the addresses of the first computer and the intermediate computer, a unique identity, and other security parameters. The unique identity is one or more SPI values and the other security parameters contain e.g. the IPsec sequence number(s). The number of SPI values depends on the SA bundle size (e.g. ESP+AH bundle would have two SPI values). In the following, when an SA is referred to, the same applies to an SA bundle. The other related security parameters, containing e.g. the algorithm to be used, a traffic description, and the lifetime of the SA, are not sent on the wire. Only SPI and sequence number are sent for each IPsec processed header (one SPI and one sequence number if e.g. ESP only is used; two SPIs and two sequence numbers if e.g. ESP+AH is used, etc.).

Thus, the unsecured data packet message is formed by the sending computer, which may or may not be the first computer. The IP header of this packet has IP source and destination address fields (among other things). The packet is encapsulated e.g. wrapped inside a tunnel, and the resulting packet is secured. The secured packet has a new outer IP header, which contains another set of IP source and destination addresses (in the outer header—the inner header is untouched), i.e. there are two outer addresses (source and destination) and two inner addresses. The processed packet has a unique identity, the IPsec SPI value(s).

An essential idea of the invention is to use the standard protocol (IPSec) between the intermediate computer and the second computer and an "enhanced IPSec protocol" between the first computer and the intermediate computer. IPsec-protected packets are translated by the intermediate computer, without undoing the IPsec processing. This avoids both the overhead of double tunneling and the security problem involved in using separate tunnels.

The translation is performed e.g. by means of a translation table stored at the intermediate computer. The outer IP header address fields and/or the SPI-values are changed by the intermediate computer so that the message can be forwarded to the second computer.

By modifying the translation table and parameters associated to a given translation table entry, the properties of the connection between the first and the intermediate computers can be changed without establishing a new IPsec connection, or involving the second computer in any way.

One example of a change in the SA between the first computer and the intermediate computer is the change of addresses for enabling mobility. This can be accomplished in the invention simply by modifying the translation table entry address fields. Signaling messages may be used to request such a change. Such signalling messages may be authenticated and/or encrypted, or sent in plaintext. One method of doing authentication and/or encryption is to use an IPsec connection between the first computer and the intermediate computer. The second computer is unaware of this IPsec connection, and does not need to participate in the signalling protocol in any way. Several other methods of signalling exist, for instance, the IKE key exchange protocol maybe extended to carry such signalling messages.

In the signalling, e.g. a registration request is sent from the first computer to the intermediate computer which causes the intermediate computer to modify the addresses in the mapping table and thus, the intermediate computer can identify the mobile next time a message is sent.

Preferably, as a result of a registration request, a reply registration is sent from the intermediate computer back to the first computer.

Other examples of possible modifications to the SA—or in general, the packet processing behaviour—between the first computer and the intermediate computer are the following.

One example is the first computer and the intermediate computer performs some sort of retransmission protocol that ensures that the IPSec protected packets are not dropped in the route between the first and the intermediate computer. This may have useful applications when the first computer is connected using a network access method that has a high packet drop rate—for instance, GPRS.

Such a protocol can be easily based on e.g. IPsec sequence number field and the replay protection window, which provide a way to detect that packet(s) have been lost. When a receiving host detects missing packets, it can send a request message for those particular packets. The request can of course be piggy-backed on an existing data packet that is being sent to the other host. Another method of doing the retransmissions may be based on using an extra protocol inside which the IPSec packets are wrapped for transmission between the first and intermediate computer. In any case, the second computer remains unaware of such a retransmission protocol.

Another example is performing a Network Address Translation (NAT) traversal encapsulation between the first and the intermediate computer. This method could be based on e.g. using UDP encapsulation for transmission of packets between the first and the intermediate computer. The second computer remains unaware about this processing and does not even need to support NAT traversal at all. This is beneficial because there are several existing IPSec products that have no support for NAT traversal.

The system of the invention is a telecommunication network for secure forwarding of messages and comprises at least a first computer, a second computer and an intermediate computer. It is characterized in that the first and the second computers have means to perform IPSec processing, and the intermediate computer have means to perform IPSec translation and possibly key exchange protocol, such as IKE, translation, preferably by means of mapping tables. The intermediate computer may perform IPSec processing related to other features, such as mobility signalling described above or other enhancements.

The IPSec translation method is independent of the key exchange translation method. Also manual keying can be used instead of automatic keying. If automatic keying is used, any key exchange protocol can be modified for that purpose; however, the idea is to keep the second computer unaware of the interplay of the first and the intermediate computer.

An automatic key exchange protocol may be used in the invention in several ways. The essential idea is that the second computer sees a standard key exchange protocol run, while the first and the intermediate computer perform a modified key exchange. The modified key exchange protocol used between the first and the intermediate computer ensures that the IPsec translation table and other parameters required by the invention are set up as a side-effect of the key exchange protocol. One such modified protocol is presented in the application for the IKE key exchange protocol.

Each translation table consists of entries that are divided into two partitions. The first partition contains information fields related to the connection between the first computer and the intermediate computer, while the second partition contains information fields related to the connection between the intermediate computer and the second computer.

The translation occurs by identifying the translation table entry by comparing against one partition, and mapping into the other. For traffic that is flowing from the first computer towards the second computer, through the intermediate computer, the entry is found by comparing the received packet against entries in the first partition, and then translating said fields using information found in the second partition of the same entry. For traffic flowing in the opposite direction, the second partition is used for finding the proper translation table entry, and the first partition for translating the packet fields.

The IPSec translation table partitions consist of the following information: the IP local address and the IP remote address (tunnel endpoint addresses) and SPIs for sending and receiving data.

As mentioned, a translation table entry consists of two such partitions, one for communication between first computer and the intermediate computer, and another for communication between the intermediate computer and the second computer.

The invention described solves the above problems of prior art. The solution is based on giving the first computer, e.g. if it is mobile, an appearance of a standard computer for the second computer. Thus, the second computer will believe it is talking to a standard IPSec host, while the intermediate computer and the second computer will work together using a modified protocol, for instance a slightly modified IPSec and IKE that helps to accomplish this goal. There are, however, several other control protocols that could conceivably be used between the first and the intermediate computer.

In the following, the invention is described more in detail by using figures by means of some embodiment examples to carry out the invention. The invention is not restricted to the details of the figures and accompanying text, or any existing protocols, such as the currently standardised IPSec or IKE.

Especially, the invention can be concerned with other kinds of telecommunication networks wherein the method of the invention can be applied than that of the figures.

BRIEF DESCRIPTION OF THE DRAWINGS

FIG. 3 illustrates an example of an IPSec translation table used by the intermediate computer to change the outer IP address and SPI value.

FIG. 5 illustrates an example of translation tables for the modified key exchange of the invention.

FIG. 6 shows a mapping table for identification values of the user Security Gateway (SGW) addresses.

DETAILED DESCRIPTION OF THE INVENTION

Figure 1:
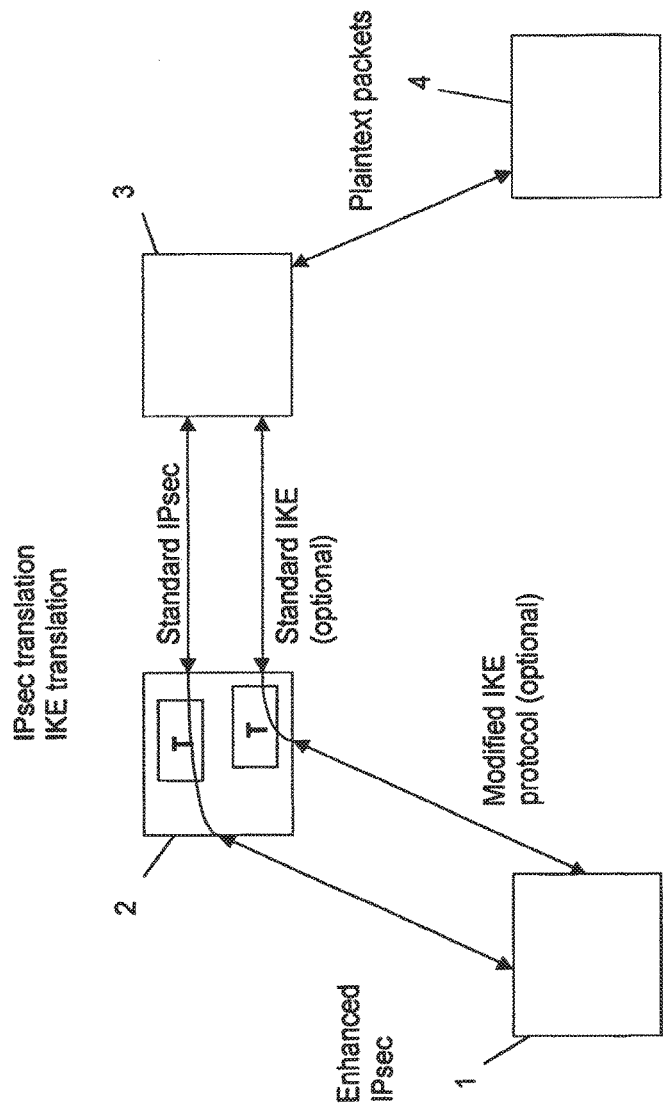
FIG. 1 illustrates an example of a telecommunication network of the invention.

An example of a telecommunication network of the invention is illustrated in FIG. 1, comprising a first computer, here a client computer 1 served by an intermediate computer, here as a server 2, and a host computer 4, that is served by the second computer, here a security gateway (SGW) 3. The security gateway supports the standard IPSec protocol and optionally the IKE key exchange protocol. The client computer and the server computer support a modified IPSec and IKE protocol.

The invention is not restricted to the topology of FIG. 1. In other embodiments, the first computer may e.g. be a router; or there might e.g. not be a host behind the second computer (in which case the first and the second computer are talking to each other directly), etc.

Figure 2:
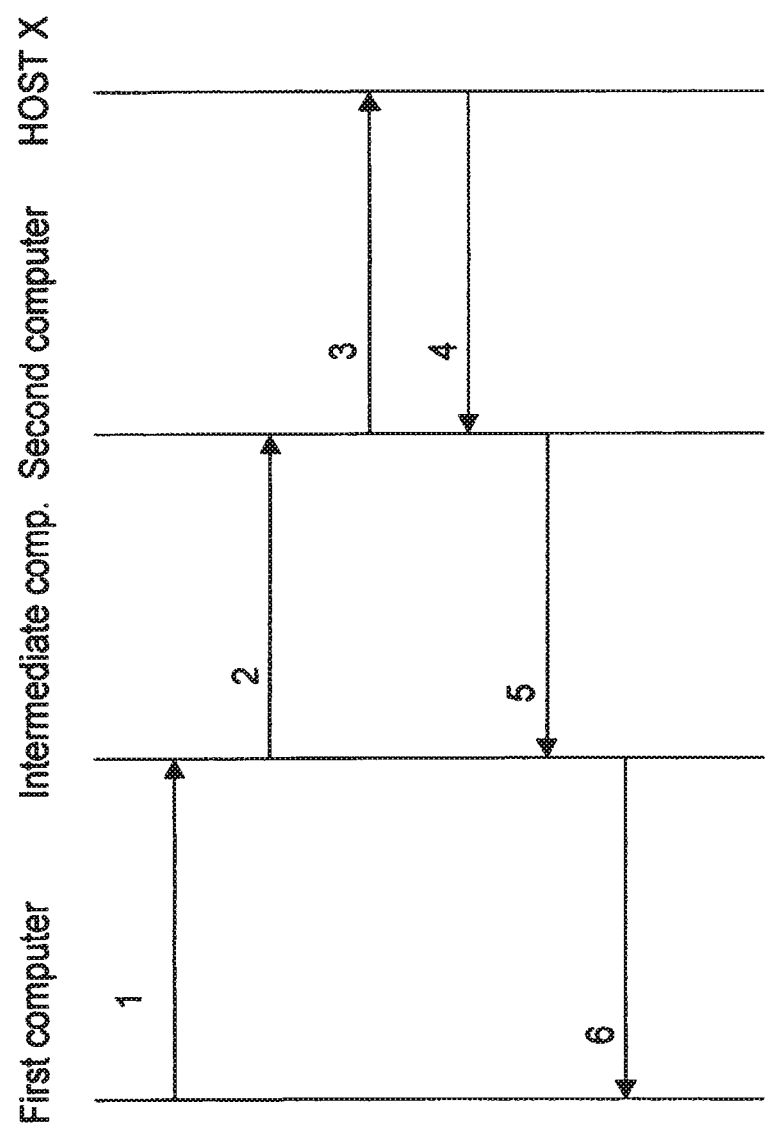
FIG. 2 describes generally an example of the method of the invention.

The IPSec translations taking place in the scenario of FIGS. 1, 2, and 3 are discussed first. The IPSec connections (such as SAs) in the scenario may be established manually, or using some key exchange protocol, such as the Internet Key Exchange (IKE). To illustrate how a key exchange protocol would be used in the scenario of FIG. 1, a modified IKE protocol based on IKE translation is also presented later.

In the invention, an IPSec connection is shared by the first computer and the second computer, while the intermediate computer holds information required to perform address and IPSec SPI translations for the packets. These translations accomplish the effect of "double tunnelling" (described in the technical background section), but with the method of the invention the confidentiality of the packets is not compromised, while simultaneously having no extra overhead when compared to standard IPSec. The intermediate computer does not know the cryptographic keys used to encrypt and/or authenticate the packets, and can thus not reveal their contents.

The advantage of the invention is that the logical IPSec connection shared by the first and the second computer can be enhanced by the first and the intermediate computer without involvement of the second computer. In particular the so-called "ingress filtering" performed by some routers does not pose any problems when translations of addresses are used. In the example presented, each host also manages its own IPSec SPI space independently.

In the example of FIG. 1, an IPSec connection is formed between the client computer 1 (the first computer) and the security gateway 3 (the second computer). To create an IPSec tunnel, a SA (or usually a SA bundle) is formed between the respective computers with a preceding key exchange. The key exchange between the first and the second computer can take place manually or it can be performed with an automatic key exchange protocol such as the IKE protocol. For performing said key exchange, a standard IKE protocol is used between the server 2 and the security gateway 3, and a modified IKE protocol is used between the client computer 1 and the server 2. An example of a modified IKE protocol that can be used in the invention is described in connection with FIG. 4.

Messages to be sent to the host terminal 4 from the client computer 1 are first sent to the server 2, wherein an IPSec translation and an IKE translation takes place. After that the message can be sent to the security gateway 3, which sends the message further in plain text to the host terminal 4.

The method of the invention, wherein messages in packet form are sent by routing to the end destination, is generally described in connection with FIG. 2. It is assumed in the following description that the IPSec connection between the first and second computer already is formed. The IPSec connection can be set up manually or automatically by e.g. an IKE exchange protocol which is described later.

FIG. 2 illustrates the sequence of events that take place when the first computer, corresponding to the mobile terminal in FIG. 1, sends a packet to a destination host, labelled X in the figure, and when the host X sends a packet to the mobile terminal.

IP packets consist of different parts, such as a data payload and protocol headers. The protocol headers in turn consist of fields.

In step 1 of FIG. 2, the first computer, e.g. a mobile terminal, forms an IP packet that is to be sent to host X. Typically, this packet is created by an application running on the mobile terminal. The IP packet source address is the address of the mobile terminal, while the destination address is host X.

The packet is processed using an IPSec tunnel mode SA, which encapsulates the IP packet securely. The example assumes that IPSec encryption and/or authentication of ESP type is used for processing the packet, although the invention is not limited to the use of only ESP; instead, an arbitrary IPsec connection may be used.

In said processing, a new IP header is constructed for the packet, with so-called outer IP addresses. The outer source address of the packet can be the same as the inner IP address—i.e., the address of the mobile terminal—but can be different, if the mobile terminal is visiting a network. The outer source address corresponds to the care of address obtained by the mobile terminal from the visited network, in this case. The outer destination address is the address of the intermediate computer. In addition to the new IP header, an ESP header is added, when using IPSec ESP mode. The SPI field of the ESP header added by the IPSec processing is set to the SPI value that the intermediate computer uses for receiving packets from the mobile terminal. In general, there may be more than one SPI field in a packet.

The processing of packets in the intermediate computer is based on a translation table i.e. an IPSec translation table shown in FIG. 3. The table has been divided into two partitions. The left one, identified by the prefix "c-", refers to the network connection between the first computer (host 1 in FIG. 1) and the intermediate computer (host 2 in FIG. 1). The right one, identified by the prefix "s-", refers to the network connection between the intermediate computer and the second computer (computer 3 in FIG. 1). The postfix number ("-1", "-2", or "-3") identifies the host in question. Thus, the address fields ("addr") refer to outer addresses of a packet, while the SPI fields ("SPI") refer to the receiver of packets, which packets were sent with this SPI. Thus, "c-SPI-2" is the SPI value used by host 2 (the intermediate computer) when receiving packets from host 1 (the first computer), and the SPI-value "c-SPI-1" is the SPI-value with which the first computer receives messages and the SPI-value with which the intermediate computer sends messages to the first computer and so on.

In terms of FIG. 3, the outer source address would be "c-addr-1" (195.1.2.3), the outer destination address "c-addr-2" (212.90.65.1), while the SPI field would be "c-SPI-2" (0x12341234). The notation 0xNNNNNNNN indicates a 32-bit unsigned integer value, encoded using a hexadecimal notation (base 16). The inner source address is processed by IPSec in the first computer, and would typically be encrypted. In this example, the inner source address would be the static address of the mobile terminal, e.g. 10.0.0.1.

When the intermediate computer receives the packet sent in step 1 described above, it performs an address and SPI translation, ensuring that the security gateway (host 3 of FIG. 1) can accept the packet. Most of the packet is secured using IPSec, and since the intermediate computer does not have the cryptographic keys to undo the IPSec processing done by the mobile terminal, it cannot decrypt any encrypted portions of the packet but is able to use the outer IP addresses and the incoming SPI value to determine how to modify the outer address and the SPI to suite the second computer, which is the next destination. SPI is now changed to 0x56785678 in the intermediate computer and the address is changed to the address of the second computer. This is done by means of the IPSec translation table of FIG. 3.

The first row of FIG. 3 is a row that the intermediate computer has found that matches the packet in the example, and thus the intermediate computer chooses it for translation. The new outer source address s-addr-2 (212.90.65.1) is substituted for the outer source address c-addr-1 (195.1.2.3), and the new outer destination address s-addr-3 (103.6.5.4) is substituted for the outer destination address c-addr-2 (212.90.65.1). The new SPI value, s-SPI-3 (0x56785678), is substituted for the SPI value c-SPI-2 (0x12341234). If more than one SPI values are used, all the SPI values are substituted similarly. In the example, s-addr-2 and c-addr-2 happen to be the same on both partitions of the table. This is not necessarily so but the intermediate computer might use another address for sending.

In step 2 of FIG. 2, the translated packet is sent further to the second computer. The inner IP packet has not been modified after that the first computer sent the packet. The second computer processes the packet using standard IPSec algorithms. The security gateway (the second computer) can e.g. decipher and/or check the authenticity of the packet, then remove the IPSec tunnelling, and forward the original packet towards the destination host, X. Thus, the entire original packet was unaffected by the translation as the IP header, and thus the address fields, was covered by IPSec.

After uncovering the original packet from the IPsec tunnel, the second computer makes a routing decision based on the IP header of the original packet. In the example, the IP destination address is X (host X in FIG. 2), and thus the second computer delivers the packet either directly to X, or to the next hop router.

In step 3 of FIG. 2, the packet is sent from the second computer (corresponding to SGW in FIG. 1) to host X, having now only the original source IP address 10.0.0.1 and the original destination IP address X in the IP header. Thus, in step 3, host X receives the packet sent by the second computer. Usually, an application process running on host X would generate some return traffic. This would cause an IP packet to be generated and sent to the second computer.

If a packet is sent back from host X to the first computer (corresponding to the client computer in FIG. 1), steps analogous to steps 1-3 are performed. The packet is thus first sent to the second computer, with the source IP address being X and the destination IP address being 10.0.0.1, in step 4. The generated packet is then received by the second computer. The IPSec policy of the second computer requires that the packet be IPSec-processed using a tunnel mode IPSec SA. This processing is similar to the one in steps 1 and 2. A new, outer IP header is added to the packet in the second computer, after which the resulting packet is secured using the IPSec SA. The outer IP source address is set to s-addr-3 (103.6.5.4) while the outer IP destination address is set to s-addr-2 (212.90.65.1). The SPI field is set to s-SPI-2 (0xc1230012). In step 5, the resulting packet is sent to the address indicated by the new outer IP destination address, s-addr-2, the intermediate computer. The intermediate computer receives the packet and performs a similar address and SPI translation.

The inner addresses are still the same, and are not modified by the intermediate computer. Since the packet intended to be sent to the first computer, the new, translated outer destination IP address indicate the address of the first computer.

The resulting packet is sent to the first computer in step 6.

As a result of step 6, the packet is received by the first computer. The IPSec processing is undone, i.e. decryption and/or authentication is performed, and the original packet is uncovered from the IPSec tunnel. The original packet is then delivered to the application running on the first computer. In case the first computer acts as a router, the packet may be delivered to a host in a subnet for which the first computer acts as a router.

The first computer may be a mobile terminal, the outer address of which changes from time to time. The translation table is then modified using some form of signalling messages, as described in the summary section. Upon receiving a request for modifying a translation, the intermediate computer updates the related translation table entry to match the new information supplied by the first computer. The operation of the protocol then proceeds as discussed above.

The above discussion is a limited example for illustration purposes. In other embodiments e.g. more than one SA for the connection—for instance, ESP followed by AH, can be used. This introduces two SPI values that must be translated. More than two is also, of course, possible. Furthermore, the example was considered for IPsec ESP only. The changes required for an embodiment in which AH (or ESP+AH) is used, are discussed next.

Changes for Using AH:

If the Authentication Header (AH) IPSec security transform is to be used, there are more considerations than in the previous example. In particular, modifications of the packet fields—even the outer IP header—are detected if AH is used. Thus, the following nominal processing is required by the first computer. The second computer performs standard IPSec processing also in this case.

In step 1, when sending a packet, the first computer must perform IPsec processing using the SPI values and addresses used in the connection between the intermediate computer and the second computer. For instance, the SPI value would be s-SPI-3, the outer source address s-addr-2, and the outer destination address s-addr-3. The AH integrity check value (ICV) must be computed using these values. ICV is a value, which authenticates most of the fields of the packet. In practice, all fields that are never modified by routers are authenticated.

After computing the AH integrity check value, the outer addresses and the SPI value are replaced with the values used between the first computer and the intermediate computer: c-addr-1 for the outer source address, c-addr-2 for the outer destination address, and c-SPI-2 for the SPI.

In step 2, the intermediate computer performs the address and SPI translations as in the example with ESP described above. The resulting packet is identical to the one used by the first computer for the AH integrity check value calculation, except possibly for fields not covered by AH (such as the Time-To-Live field, the header checksum, etc). Thus, the AH integrity check value is now correct.

In step 3, the second computer performs standard IPSec processing of AH. The packet, which now is uncovered from the tunnel is sent to the host X. As in the previous example, an application in host X usually generates a return packet that is to be sent to the first computer. This packet is sent to the second computer in step 4.

Upon receiving the packet, the processing of the second computer are the same as in the example with ESP. The second computer computes an AH integrity check value of the tunneled packet it is sending to the mobile terminal. The integrity check value is computed against the outer source address of s-addr-3, outer destination address of s-addr-2, and the SPI value of s-SPI-2.

In step 5, when the intermediate computer receives the packet, it performs ordinary translation of the packet. The new outer source address is c-addr-2, the outer destination address is c-addr-1, and the SPI value is c-SPI-1. At this point the AH integrity check value is incorrect, which was caused by the translations.

When the mobile terminal receives the packet, it performs a translation of the current outer addresses and the SPI field for the original ones used by the second computer: s-addr-3 for the outer source address, s-addr-2 for the outer destination address, and s-SPI-2 for the SPI value. This reproduces the packet originally sent by the second computer, except possibly for fields not covered by AH. This operation restores the AH integrity check value to its original, correct value. The AH integrity check is then performed against these fields.

Key Exchange Considerations

The above example discussed the "steady state" IPSec translations performed by the intermediate computer. The IPSec SAs and the IPSec translation table entries may be set up manually, or using some automated protocol, such as the Internet Key Exchange (IKE) protocol.

Because the security gateway (the second computer) is a standard IPSec host, it implements some standard key exchange protocol, such as IKE. The first computer and the intermediate computer may use some modified version of IKE, or any other suitable automatic key exchange protocol.

The key exchange must appear as a standard key exchange according to the key exchange protocol supported by the security gateway (the second computer), such as IKE. Also, the overall key exchange performed by the first, intermediate, and second computer must establish not only cryptographic keys, but also the IPSec translation table entries. The overall key exchange protocol should not reveal the IPSec cryptographic keys to the intermediate computer to avoid even the potential for security problems.

In the following, an example of a modified IKE protocol is presented to outline the functionality of such a protocol in the context of the invention. The protocol provides the functionality described above. In particular, the intermediate computer has no knowledge of the IPSec cryptographic keys established. The protocol is presented on a general level to simplify the presentation.

The automatic IKE protocol is used prior to other protocols to provide strongly authenticated cryptographic session keys for the IPSec protocols ESP and AH. IKE performs the following functions: (1) security policy negotiation (what algorithms shall be used, lifetimes etc.), (2) a Diffie-Hellman key exchange, and (3) strong user/host authentication (usually using either RSA-based signatures or pre-shared authentication keys). IKE is divided into two phases: phase 1 and phase 2. Phase 1 negotiates and establishes cryptographic keys for internal use of the IKE protocol itself, and also performs the strong user or host authentication. Phase 2 negotiates and establishes cryptographic keys for IPSec. If IPSec tunnel mode is used, phase 2 also negotiates the kind of traffic that may be sent using the tunnel (so-called traffic selectors).

The IKE framework supports several "sub-protocols" for phase 1 and phase 2. The required ones are "main mode" for phase 1, and "quick mode" for phase 2. These are used as illustrations, but the invention is not limited to these sub-protocols of IKE.

For the security gateway (second computer), the IKE session seems to be coming from the address s-addr-2 in FIG. 3. Since there may be any number of mobile terminals served by the intermediate computer, the intermediate computer should either (1) manage a pool of addresses to be used for the s-addr-2 translation table address, thus providing each user with a separate "surrogate address", or (2) use the same address (or a limited set of addresses), and ensure that the mobile terminals are identified using some other means than their IP address (IKE provides for such identification types, so this is not a problem).

The modified IKE protocol specified is analogous to the IPSec translation table approach. However, instead of SPIs, the so-called IKE cookies are used as translation indices instead. IKE cookies are essentially IKE session identifiers, and are thus analogous to the IPSec SPI values, which is another form of a session or context identifier. There are two cookies: the initiator cookie, chosen by the host that initiates the IKE session, and the responder cookie, chosen by the host that responds to a session initiation.

The essential features of the protocol are (1) that it appears to be an entirely ordinary IKE key exchange for the security gateway, (2) that the IPsec translation table entry is formed by the intermediate computer during the execution of the protocol, (3) that the first computer obtains all the necessary information for its packet processing, and (4) that the intermediate computer does not obtain the IPsec cryptographic session keys.

The overall steps of the protocol are:
1. The first computer initiates the key exchange protocol by sending a message to the intermediate computer. This message is essentially the IKE main mode initiation message, with some modifications required for this application.
2. The intermediate computer determines which security gateway (second computer) to forward this IKE session to, and also establishes a preliminary IKE translation table entry based on the information available from the message.
3. The security gateway (the second computer) replies to the IKE main mode initiation message.
4. The intermediate computer completes the IKE mapping based on the reply message.
5. The modified IKE protocol run continues through IKE main mode (the phase 1 exchange), which is followed by quick mode (the phase 2 exchange). Extensions of standard IKE messages are used between the first computer and the intermediate computer to accomplish the extra goals required by this modified IKE protocol.

Figure 4:
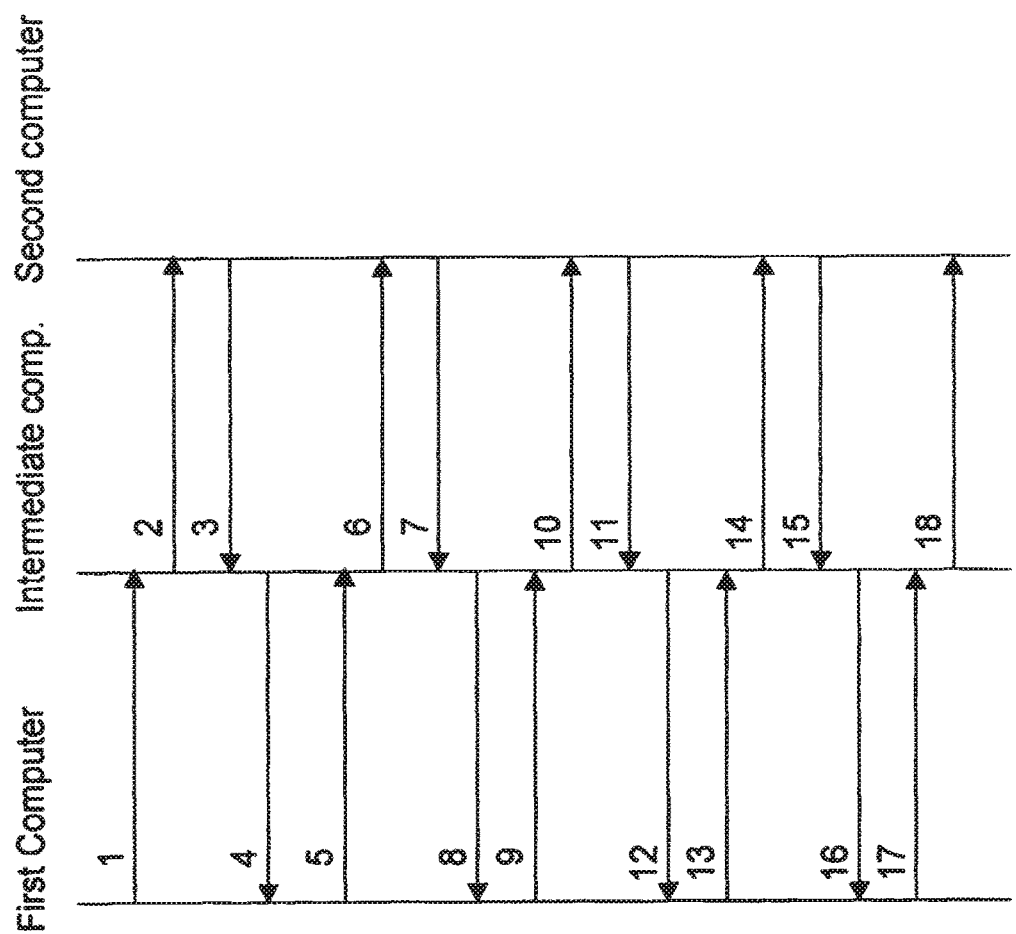
FIG. 4 describes a detailed example of how the SA is formed in the invention.

In FIG. 4, the IKE session is described message by message. The following text indicates the contents of each message, and how they are processed by the various hosts. There are six main mode messages in the protocol, named mm1, mm2, . . . , mm6, and three quick mode messages, named qm1, qm2, and qm3.

FIG. 5 illustrates the IKE translation table entry related to the modified IKE key exchange being performed. The bolded entries in each step are added or changed in that step as a result of the processing described in the text.

The IKE translation table partition for the connection between the first computer and the intermediate computer is as follows (the field name in FIG. 5 is given in parentheses):
Local and remote IP address (c-addr-1, c-addr-2)
Initiator and responder cookie (c-icky, c-rcky)
IKE identification of the first computer (c-userid, e.g. joe@netseal.com)

The IKE translation table partition for the connection between the intermediate computer and the second computer is as follows (the field name in FIG. 5 is given in parentheses):
Local and remote IP address (s-addr-2, s-addr-3)
Initiator cookie and responder cookie (s-icky, s-rcky)

In addition to these entries, other data may be kept by the intermediate computer and/or the first computer.

The key exchange is initiated by generating an initiator cookie and sending a zero responder cookie to the second computer. A responder cookie is generated in the second computer and a mapping between IP addresses and IKE cookie values in the intermediate computer is established. A translation table to modify IKE packets in flight by modifying the external IP addresses and possibly IKE cookies of the IKE packets is used.

Either the modified IKE protocol between the first computer and the intermediate computer is modified such that the IKE keys are transmitted from the first computer to the intermediate computer for decryption and modification of IKE packets or, alternatively, the modified IKE protocol between the first computer and the intermediate computer is modified such that the IKE keys are not transmitted from the first computer to the intermediate computer for decryption and modification of IKE packets, and the modification of IKE packets is done by the first computer with the intermediate computer requesting such modifications. The latter alternative is discussed in the example that follows, since it is more secure than the first alternative.

Extra information, such as user information and SPI change requests, to be sent between the first and the intermediate computer, is sent by appending the extra information to the standard IKE messages. The IKE standard has message encoding rules that indicate a definite length, thus the added extra information can be separated from the IKE message itself. The extra information fields are preferably encrypted and authenticated, for instance by using a secret shared by the first computer and the intermediate computer. The details of this process are not relevant to the invention.

The extra information slot in each IKE message is called the message "tail" in the following.

IKE messages consist of an IKE header, which includes the cookie fields and message ID field, and of a list of payloads. A payload has a type, and associated information.

FIG. 4 considers an example of the routing of packets according to the invention considering IPSec security association set-up for distribution of keys. As in the foregoing FIG. 2, the session begins with sending a packet from the client (first computer) to the server (intermediate computer).

The key exchange is initiated by the first computer. Thus, in step 1 of FIG. 4, the first computer constructs mm1. The IP header of the message contains the following values:
IP source address: 195.1.2.3 (c-addr-1)
IP destination address: 212.90.65.1 (c-addr-2)
The IKE header contains the following values (step 1 in Figure X):
Initiator cookie: CKY1 (c-icky)
Responder cookie: 0 (c-rcky)
Message ID: 0

The message contains the following payloads:
A Security Association (SA) payload, which contains the IKE phase 1 security policy offers from the first computer.
The message may contain additional payloads, such as Vendor Identification (VID) payloads, certificate requests/responses, etc.
A VID payload can be used to indicate that the first computer supports the protocol described here.
The message tail contains the following information:
User identification type and value—the c-userid field. These are used by the intermediate computer to choose a security gateway to forward this session to. The identification type may be any of the IKE types, but additional types can be defined. An alternative to this field is to directly indicate the security gateway for forwarding. There are other alternatives as well, but these are not essential to the invention.

In step 2, the mm1 is received by the intermediate computer. The intermediate computer examines the message, and forms the preliminary IKE translation table entry. FIG. 5, step 1 illustrates the contents of this preliminary entry. The c-userid field is sent in the mm1 tail.

The intermediate computer then determines which security gateway to forward this IKE session to. The determination may be based on any available information, static configuration, load balancing, or availability requirements. The presented, simple method is to use the identification information in the mm1 tail to look up the first matching identification type and value from a table. An example of such a table is presented in FIG. 6.

The identification mapping table of FIG. 6, is one method for choosing a security gateway that matches the incoming mobile terminal. The identification table would in this example be an ordered list of identification type/value entries, that match to a given security gateway address. When the incoming mobile terminal identification matches the identification in the table, the corresponding security gateway is used. For instance, john.smith@netseal.com would match the first row of the table, i.e., the security gateway 123.1.2.3, while joe@netseal.com matches the second row, i.e., the security gateway 103.6.5.4. The identification types include any identification types defined for the IKE protocol, and may contain other types as well, such as employee numbers, etc.

Other methods of determining the security gateway to be used may be employed. One such method is for the mobile terminal to directly indicate a given security gateway to be used. The mobile terminal may also indicate a group of security gateways, one of which is used. The exact details are not relevant to the invention.

In addition to determining the security gateway address, the intermediate computer determines which address its for communication between itself and the second computer. The same address as is used for the communication between the first and the intermediate computer may be used, but a new address may also be used. The address can be determined using a table similar to the one in FIG. 6, or the table of FIG. 6 may be extended to include this address.

The intermediate computer then generates its own initiator cookie. This is done to keep the two session identifier spaces entirely separate, although the same initiator cookie may be passed as is.

After these determinations, the preliminary translation table entry is modified. FIG. 5, step 2 illustrates the contents of the entry at this point.

The original IP header fields are modified as follows (step 2 in FIG. 4):
IP source address: 212.90.65.1 (s-addr-2)
IP destination address: 103.6.5.4 (s-addr-3)
The IKE header is modified as follows:
Initiator cookie: CKY2 (s-icky)
Responder cookie: 0 (s-rcky)
Message ID: 0
The message tail is removed. The VID payload that identifies support for this modified protocol is also removed. The mm1 is then forwarded to the second computer.

In step 3, the second computer responds with mm2. The IP header of the message contains the following values (step 3 in FIG. 4):
IP source address: 103.6.5.4 (s-addr-3)
IP destination address: 212.90.65.1 (s-addr-2)
The IKE header contains the following values:
Initiator cookie: CKY2 (s-icky)
Responder cookie: CKY3 (s-rcky)
Message ID: 0
The message contains the following payloads:
Security Association (SA) payload. This is a reply to the offer by the first computer, and indicates which security configuration is acceptable for the second computer (this scenario assumes success, so the case of an error reply is not considered).
Possibly optional IKE payloads, such as VID payloads, certificate requests/replies, etc.
There is no message tail.

In step 4, the mm2 is received by the intermediate computer. The intermediate computer updates its IKE translation table based on the received message. Step 3 in FIG. 5 illustrates the contents of the translation table entry at this point.

The intermediate computer generates its own responder cookie, CKY4, and updates the translation table yet again. Step 4 in FIG. 5 illustrates the entry at this point. After this step, the translation table entry is complete, and the address and cookie translations are performed as in steps 1-4 for the following messages.

The translated message contains the following IP header fields (FIG. 4, step 4)
IP source address: 212.90.65.1 (c-addr-2)
IP destination address: 195.1.2.3 (c-addr-1)
The translated IKE header contains the following fields:
Initiator cookie: CKY1 (c-icky)
Responder cookie: CKY4 (c-rcky)
The message contains the following payloads:
The SA payload sent by the second computer.
Any optional payloads sent by the second computer.
A VID payload may be added to indicate support of this modified protocol to the first computer.
A message tail is added, and contains the following information:
Address and/or identification information of the chosen security gateway (the second computer).
This information can be used by the client to choose proper authentication information, such as RSA keys.
The message is then forwarded to the first computer.

In step 5, the first computer constructs mm3. The message contains the following payloads:
A Key Exchange (KE) payload, that contains Diffie-Hellman key exchange data of the first computer.
A Nonce (NONCE) payload, that contains a random number chosen by the first computer.
Possibly optional IKE payloads.
The message is sent to the intermediate computer.

In step 6, the mm3 is forwarded to the second computer. The contents of the message are not changed, only the IP header addresses and the IKE cookies, in the manner described in steps 1-4.

In step 7, the second computer receives mm3 and responds with mm4. The message contains the following payloads:
- A Key Exchange (KE) payload, that contains Diffie-Hellman key exchange data of the second computer.
- A Nonce (NONCE) payload, that contains a random number chosen by the second computer.
- Possibly optional IKE payloads.

In step 8, the mm4 is forwarded to the first computer.

In step 9, the first computer constructs mm5, which is the first encrypted message in the session. All subsequent messages are encrypted using the IKE session keys established from the previous Diffie-Hellman key exchange (the messages mm3 and mm4) by means of hash operations, as described in the IKE specification. Note that the intermediate computer does not possess these keys, and can thus not examine the contents of any subsequent IKE messages. In fact, the intermediate computer has no advantage compared to a hostile attacker if it attempts to decipher the IKE traffic. Instead, the intermediate computer indirectly modifies some fields in the IKE messages by sending a modification request in the IKE message tail to the first computer, which does the requested modifications before IKE encryption processing.

The message contains the following payloads:
- An Identification (ID) payload, that identifies the first computer to the second computer. This identification may be the same as the identification sent in the mm1 tail, but may differ from that. These two identifications serve different purposes: the mm1 tail identification (c-userid) is used to select a security gateway for IKE session forwarding (the second computer), while the ID payload in this message is used by the second computer for IKE authentication purposes, for instance, to select proper RSA authentication keys.
- A Signature (SIG) or Hash (HASH) payload, that serves as an authenticator. A signature payload is used if RSA- or DSS-based authentication is used, while a hash payload is used for pre-shared key authentication. There are other authentication methods in IKE, and IKE can also be extended with new authentication methods. These are not essential to the invention, and the following text assumes RSA authentication (i.e., use of the signature payload).
- Possibly optional IKE payloads.

The message tail contains the-following information:
- The SPI value that the first computer wants to use for receiving IPsec-protected messages from the intermediate computer, i.e., the c-SPI-1 value of the IPsec translation table in FIG. 3. More than one SPI value could be transmitted here, but for simplicity, the following discussion assumes that only a single SPI is necessary (i.e. only one SA is applied for IPsec traffic processing). Extending the scheme to multiple SPIs is straightforward.

In step 10, the mm5 is forwarded to the second computer. The intermediate computer removes the message tail, and performs the IKE translation discussed previously, and then forwards the message to the second computer.

In step 11, the second computer receives the mm5 message, and authenticates the user (or the host, depending on what identification type is used). Assuming that the authentication succeeds, the second computer proceeds to authenticate itself to the first computer.

The mm6 message contains the following payloads:
- An Identification (ID) payload, that identifies the second computer to the first computer.
- A Signature (SIG) payload (here RSA authentication is assumed).
- Possibly optional IKE payloads.

In step 12, the mm6 is received by the intermediate computer. The intermediate computer does not change the message itself, but adds a tail with the following information:
- The SPI value that the intermediate computer wants the first computer to offer to the second computer in the qm1 message. Since the intermediate computer cannot access the contents of the IKE messages, this modification request is made using the message tail (see the discussion of step 9). The SPI value sent matches the s-SPI-2 field of the IPsec translation table of FIG. 3.
- The SPI value that the intermediate computer wants the first computer to use for messages sent to itself. This matches the c-SPI-2 field of the IPsec translation table of FIG. 3.

The resulting message is forwarded to the first computer.

In step 13, the first computer constructs qm1, which contains the following IKE payloads:
- A Hash (HASH) payload, that serves as an authenticator of the message.
- A Security Association (SA) payload, which contains the IKE phase 2 security policy offers from the first computer, i.e., the IPsec security policy offers. The SA payload contains the SPI value assigned to the first computer in the mm6 message, i.e., s-SPI-2 in FIG. 3.
- Optionally, a Key Exchange (KE) payload, if a new Diffie-Hellman key exchange is to be performed in phase 2 (this depends on the contents of the SA payload).
- A Nonce (NONCE) payload, which contains a random value chosen by the first computer.
- Optionally, two Identification (ID) payloads that indicate the IPsec traffic selectors that the first computer proposes for an IPsec tunnel mode SA. If IPsec transport mode is used, these are not necessary, but they may still be used. They may also be omitted if IPsec tunnel mode is used.

The IKE header is the same as previously, except that the Message ID field now contains a non-zero 32-bit value, that serves as a phase 2 session identifier. This identifier remains constant for the entire quick mode exchange.

The message is sent to the intermediate computer.

In step 14, the intermediate computer forwards the qm1 message to the second computer.

In step 15, the second computer inspects the security policy offers and other information contained in the qm1 message, and determines which security policy offer matches its own security policy (the case when no security policies match results in an error notification message).

The second computer responds with qm2 message that contains the following payloads:
- A Hash (HASH) payload, that serves as an authenticator of the message.
- A Security Association (SA) payload, which indicates the security policy offer chosen by the second computer. The message also contains the SPI value that the second computer wants to use when receiving IPsec-protected messages. The SPI value matches s-SPI-3 of the IPsec translation table in FIG. 3.

Optionally, a Key Exchange (KE) payload, if a new Diffie-Hellman key exchange is to be performed in phase 2.

A Nonce (NONCE) payload, which contains a random value chosen by the second computer.

If Identification (ID) payloads were sent by the first computer, the second computer also sends Identification payloads.

In step 16, the intermediate computer forwards the qm2 message to the first computer.

In step 17, the first computer constructs qm3 message, which contains the following payloads:

A Hash (HASH) payload, that serves as an authenticator of the message.

The following information is sent in the message tail:

The SPI value sent by the second computer in the qm2 message. This is sent here, because the intermediate computer cannot decrypt the qm2 message and look up the SPI from there. The SPI value matches s-SPI-3 of the IPsec translation table in FIG. 3.

In step 18, the intermediate computer receives the qm3 and reads the s-SPI-3 value from the message tail. All the information required to construct the IPsec translation table entry is now gathered, and the entry can be added to the translation table. In particular, the information fields are as follows:

c-addr-1: same as c-addr-1 of the IKE session (195.1.2.3).

c-addr-2: same as c-addr-2 of the IKE session (212.90.65.1).

c-SPI-1: received in the mm5 message tail from the first computer.

c-SPI-2: chosen by the intermediate computer, sent to the first computer in the mm6 message tail.

s-addr-2: same as s-addr-2 of the IKE session (212.90.65.1 in this example, may be different than c-addr-2).

s-addr-3: same as s-addr-3 of the IKE session (103.6.5.4).

s-SPI-2: chosen by the intermediate computer, sent to the first computer in mm6 message tail.

s-SPI-3: sent by the second computer in qm2 to the first computer, which sends it to the intermediate computer in qm3 message tail.

The intermediate computer forwards the qm3 message to the second computer, which completes the IKE key exchange, and the IPsec translation table set up.

The IPsec cryptographic keys established using the modified IKE key exchange presented above are either derived from the Diffie-Hellman key exchange performed in IKE main mode, or from the (optional) Diffie-Hellman key exchange performed in quick mode. In both cases, the intermediate computer has no access to the shared secret established using the Diffie-Hellman algorithm. In fact, the intermediate computer has no advantage when compared to a random, hostile attacker.

The above presentation was simplified and exemplified to increase clarity of the presentation. There are several issues not discussed, but these issues are not essential to the invention.

Some of these issues are the following:

The phase 1 used main mode. Any other IKE phase 1 exchange can be used; this changes the details of the protocol but not the essential ideas.

There are other approaches than the one presented here. One approach is for the first computer to reveal the IKE keys to the intermediate computer, so that the second computer is able to modify the required fields of the message (namely, SPI values).

The discussion assumes that the first computer initiates the IKE exchange. The opposite direction is possible, too, but requires more considerations.

The commit bit feature of IKE is not used. Adding that is simple.

Security gateway selection is based on a table lookup indexed by an identification type/value pair sent by the first computer. Other mechanisms are easy to implement.

The discussion assumes a successful IKE key exchange. Error cases are easy to handle.

Phase 1 policy lookup (when processing mm1 and mm2 messages) is not based on the identity of the IKE counterpart. This is not a major issue, since the phase 1 security policy can be independent of the counterpart without limiting usability.

Phase 1 is a pre-requisite for executing the protocol in the example. This can be easily changed by moving some of the "tail" items to phase 2.

The protocol establishes a pair of SAs, one for each direction, and manages the SPI value modifications of these SAs. It is easy to extend this to cover SA bundles with more than one SA, i.e., SAs applied in sequence (ESP followed by AH, for instance). This requires more than one SPI for each direction, but is easy to add to the protocol described.

The invention is not concerned with the details of the key exchange protocol. The presented outline for one such protocol is given as an example, several other alternatives exist. The invention is also not concerned with the IKE key exchange protocol: other key exchange protocols exist, and similar ideas can be applied in using them in the content of the invention.

While the present invention has been described in accordance with preferred compositions and embodiments, it is to be understood that certain substitutions and alterations may be made thereto without departing from the spirit and scope of the following claims.

We claim:

1. A computer for sending secure messages, and for enabling secure forwarding of messages in a telecommunication network by an intermediate computer to a recipient computer, comprising:

a computer configured to connect to a telecommunication network;

the computer configured to be assigned with a network address in the telecommunication network, wherein the computer is a mobile computer in that the address of the mobile computer changes;

the computer configured to form a secure message by encrypting the data payload of a message and giving the message a unique identity and a destination address of an intermediate computer, wherein the unique identity and the destination address are capable of being used by the intermediate computer to find an address to a recipient computer;

the computer configured to send the secure message to the intermediate computer for forwarding of the encrypted data payload to the recipient computer; and the computer configured to set up a secure connection using a key exchange protocol.

2. The computer of claim 1, wherein the computer is configured to form the secure message using a message received by the computer.

3. The computer of claim 1, wherein the computer is configured to encapsulate the message in an outer IP header.

4. The computer of claim 1, wherein the computer is configured to form secure messages using IPSec protocols.

5. The computer of claim 1, wherein the computer is configured to form secure messages containing data payload of a message, an inner IP header containing actual sender and receiver addresses, an outer IP header containing the addresses of the computer and the intermediate computer, and a unique identity.

6. The computer of claim 1, wherein the unique identity is one or more Security Parameter Index values.

7. The computer of claim 1, wherein the computer is configured to send a signaling message to the intermediate computer when the computer changes its address such that the intermediate computer can know that the address of the computer is changed.

8. The computer of claim 7, wherein the computer is configured to send the signaling message encrypted.

9. The computer of claim 8, wherein the computer is configured to send the signaling message authenticated.

10. The computer of claim 1, wherein the computer is configured to send the secure message using SSL or TLS protocol.

* * * * *

(12) INTER PARTES REVIEW CERTIFICATE (2857th)
United States Patent (10) Number: US 9,712,502 K1
Nuopponen et al. (45) Certificate Issued: Oct. 4, 2022

(54) METHOD AND SYSTEM FOR SENDING A MESSAGE THROUGH A SECURE CONNECTION

(71) Applicants: Antti Nuopponen; Sami Vaarala

(72) Inventors: Antti Nuopponen; Sami Vaarala

(73) Assignee: MPH TECHNOLOGIES OY

Trial Number:

IPR2019-00824 filed Mar. 29, 2019

Inter Partes Review Certificate for:

Patent No.: 9,712,502
Issued: Jul. 18, 2017
Appl. No.: 15/376,558
Filed: Dec. 12, 2016

The results of IPR2019-00824 are reflected in this inter partes review certificate under 35 U.S.C. 318(b).

INTER PARTES REVIEW CERTIFICATE
U.S. Patent 9,712,502 K1
Trial No. IPR2019-00824
Certificate Issued Oct. 4, 2022

AS A RESULT OF THE INTER PARTES REVIEW PROCEEDING, IT HAS BEEN DETERMINED THAT:

Claims 7-9 are found patentable.

Claims 1-6 and 10 are cancelled.

\* \* \* \* \*